(12) United States Patent
Manneschi

(10) Patent No.: US 10,641,890 B2
(45) Date of Patent: *May 5, 2020

(54) SHOE ANALYZER 5BIS CAPACITIVE

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,950

(22) Filed: Mar. 1, 2018

(65) Prior Publication Data

US 2018/0321372 A1    Nov. 8, 2018

Related U.S. Application Data

(62) Division of application No. 15/486,558, filed on Apr. 13, 2017.

(30) Foreign Application Priority Data

Apr. 15, 2016   (FR) ..................................... 16 53385

(51) Int. Cl.

| | | |
|---|---|---|
| *G01S 13/88* | (2006.01) | |
| *G01V 3/08* | (2006.01) | |
| *G01V 3/12* | (2006.01) | |
| *G01S 7/41* | (2006.01) | |
| *G01N 22/00* | (2006.01) | |
| *G01S 13/89* | (2006.01) | |

(52) U.S. Cl.
CPC ............ *G01S 13/887* (2013.01); *G01N 22/00* (2013.01); *G01S 7/41* (2013.01); *G01S 13/89* (2013.01); *G01V 3/08* (2013.01); *G01V 3/12* (2013.01)

(58) Field of Classification Search
CPC .......... G01S 13/887; G01S 7/41; G01S 13/89; G01R 33/20; G01V 3/08; G01V 3/12; G01V 9/00; G07C 9/00; G01N 22/00; G01N 24/00
See application file for complete search history.

(56) References Cited

U.S. PATENT DOCUMENTS 5,361,133 A * 11/1994 Brown ................... A43D 1/025
33/3 R
6,359,582 B1    3/2002 MacAleese et al.
(Continued)

FOREIGN PATENT DOCUMENTS

EP        1574879 A1    9/2005
FR        2860631 A1    4/2005
(Continued)

OTHER PUBLICATIONS

Preliminary Research Report received for French Application No. 1655729, dated Mar. 7, 2017, 2 pages (1 page of French Translation Cover Sheet and 1 page of original document).
(Continued)

*Primary Examiner* — Matthew M Barker
(74) *Attorney, Agent, or Firm* — Womble Bond Dickinson (US) LLP

(57) ABSTRACT

A detector device for detection of unauthorised objects or substances. The device includes a support base designed to receive at least one foot covered by its shoe, of an individual to be controlled. The device also includes a mechanism to measure the electrical capacity of the sole of a shoe placed on the support base.

18 Claims, 11 Drawing Sheets

(56) References Cited

U.S. PATENT DOCUMENTS

| | | | |
|---|---|---|---|
| 7,119,553 B2* | 10/2006 | Yang | G01R 27/00 324/663 |
| 7,295,019 B2* | 11/2007 | Yang | G01R 27/00 324/663 |
| 7,352,180 B2* | 4/2008 | Manneschi | G01V 3/14 324/307 |
| 7,365,536 B2* | 4/2008 | Crowley | G01R 33/441 324/300 |
| 7,636,036 B2* | 12/2009 | Manneschi | G01V 3/12 324/200 |
| 7,868,758 B2* | 1/2011 | Barral | G01V 3/088 324/244 |
| 8,424,365 B2* | 4/2013 | Crowley | G01N 24/084 73/28.01 |
| 8,654,922 B2* | 2/2014 | Bendahan | G01V 3/104 378/63 |
| 9,715,012 B2* | 7/2017 | Fernandes | G01S 13/887 |
| 2006/0176062 A1* | 8/2006 | Yang | G01R 27/00 324/663 |
| 2007/0159185 A1* | 7/2007 | Yang | G01R 27/00 324/663 |
| 2008/0036592 A1 | 2/2008 | Barral et al. | |
| 2008/0164420 A1* | 7/2008 | Manneschi | G01T 1/167 250/374 |
| 2009/0314943 A1* | 12/2009 | Breit | G01N 21/3581 250/341.1 |
| 2009/0322866 A1* | 12/2009 | Stotz | G07C 9/00087 348/77 |
| 2010/0123571 A1* | 5/2010 | Crowley | G01V 11/00 340/521 |
| 2010/0213365 A1 | 8/2010 | Crowley et al. | |
| 2011/0163876 A1* | 7/2011 | Uemura | G01V 8/005 340/540 |
| 2012/0069963 A1* | 3/2012 | Song | G01V 5/0025 378/87 |
| 2012/0307967 A1* | 12/2012 | Smith | G01V 5/0016 378/57 |
| 2014/0320331 A1 | 10/2014 | Fernandes et al. | |
| 2015/0054617 A1* | 2/2015 | Fontanet | H03K 17/962 340/5.72 |
| 2015/0179007 A1* | 6/2015 | Todaka | G07C 9/00111 340/5.6 |
| 2015/0369756 A1 | 12/2015 | Rezgui et al. | |

FOREIGN PATENT DOCUMENTS

| | | |
|---|---|---|
| FR | 2889338 A1 | 2/2007 |
| FR | 2911212 A1 | 7/2008 |
| WO | 2005/036207 A2 | 4/2005 |

OTHER PUBLICATIONS

Preliminary Research Report received for French Application No. 1655726, dated Feb. 6, 2017, 2 pages (1 page of French Translation Cover Sheet and 1 page of original document).
Preliminary Research Report received for French Application No. 1653385, dated Dec. 1, 2016, 2 pages (1 page of French Translation Cover Sheet and 1 page of original document).

* cited by examiner

FIG. 3
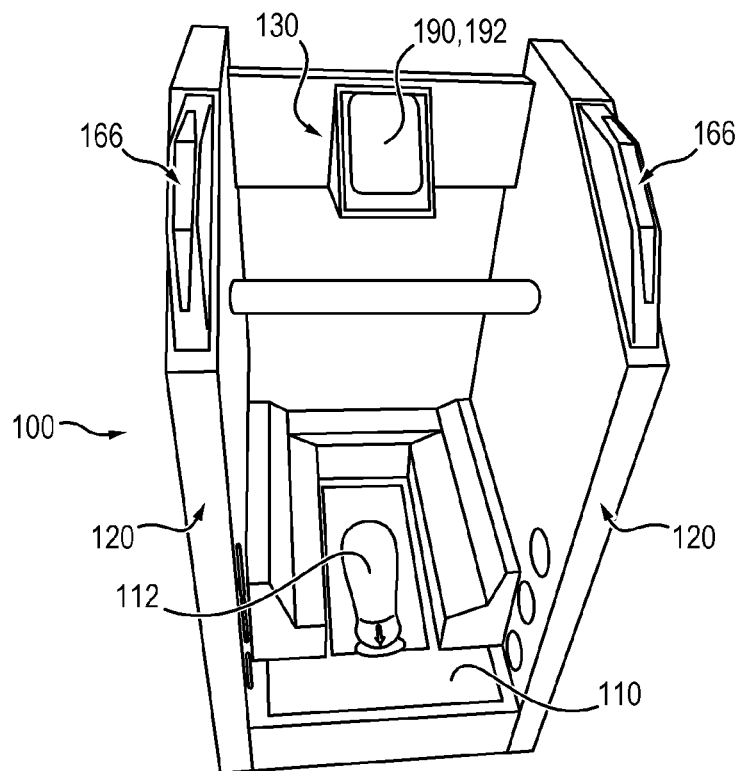
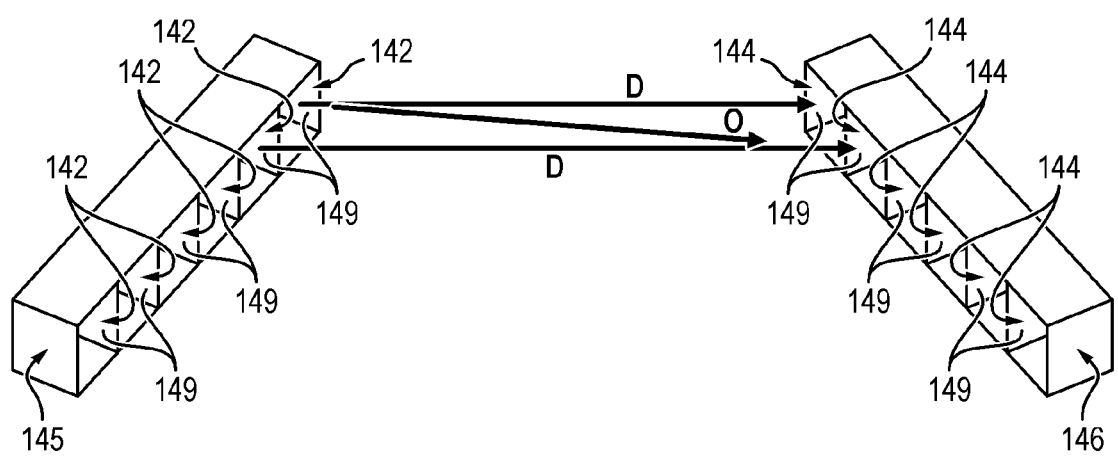
FIG. 4
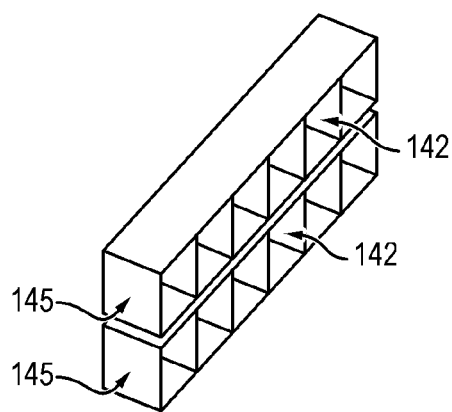
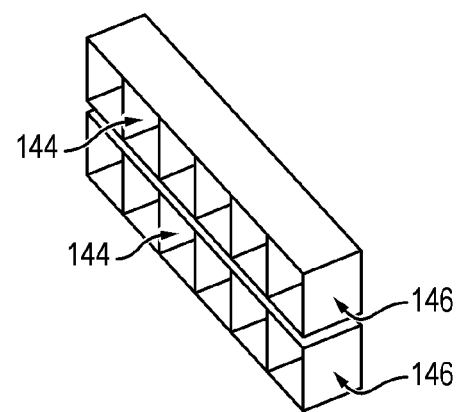

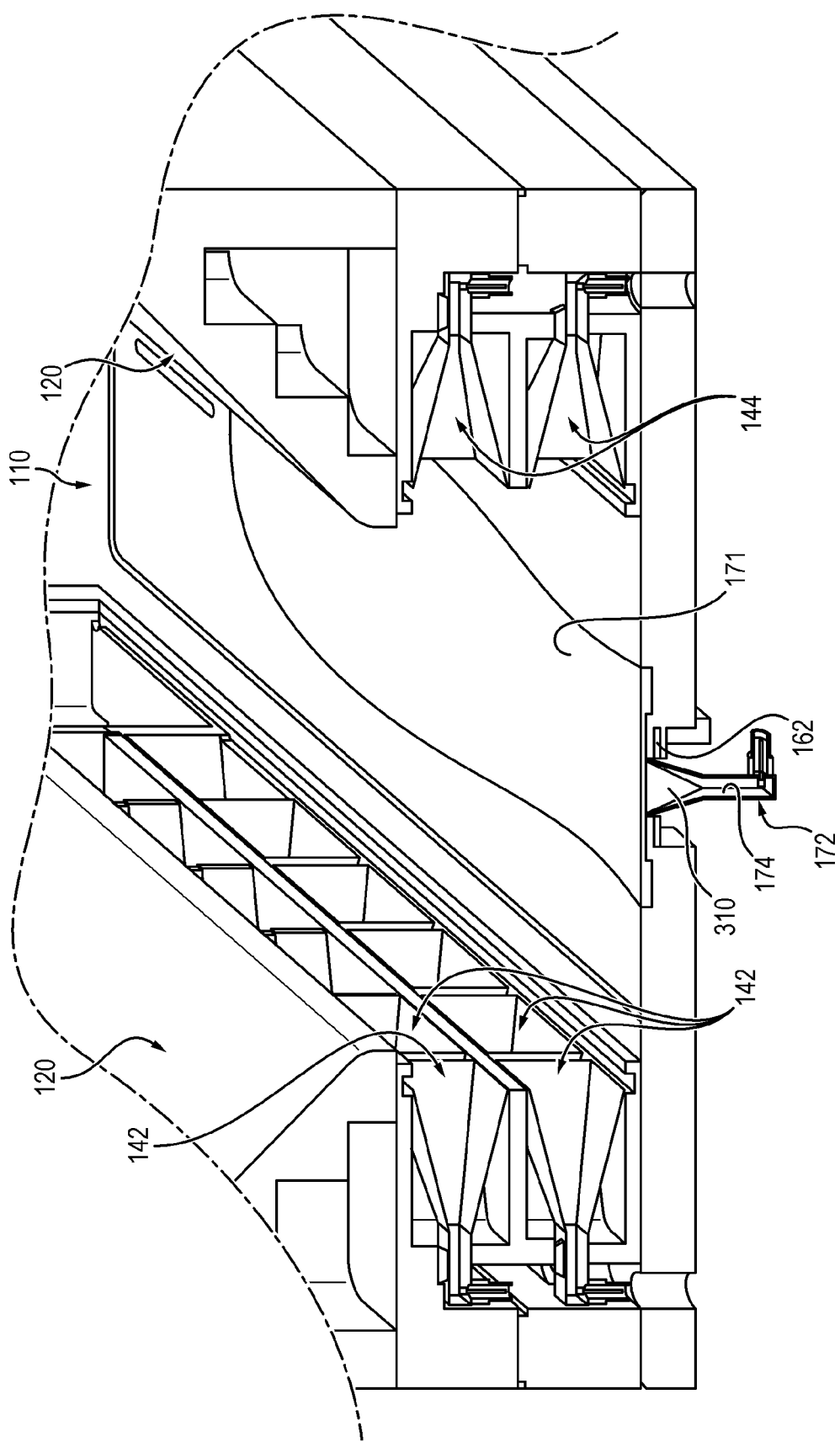

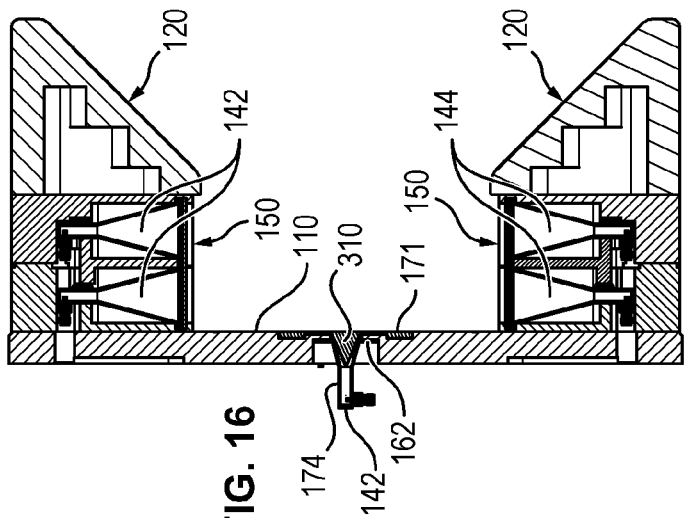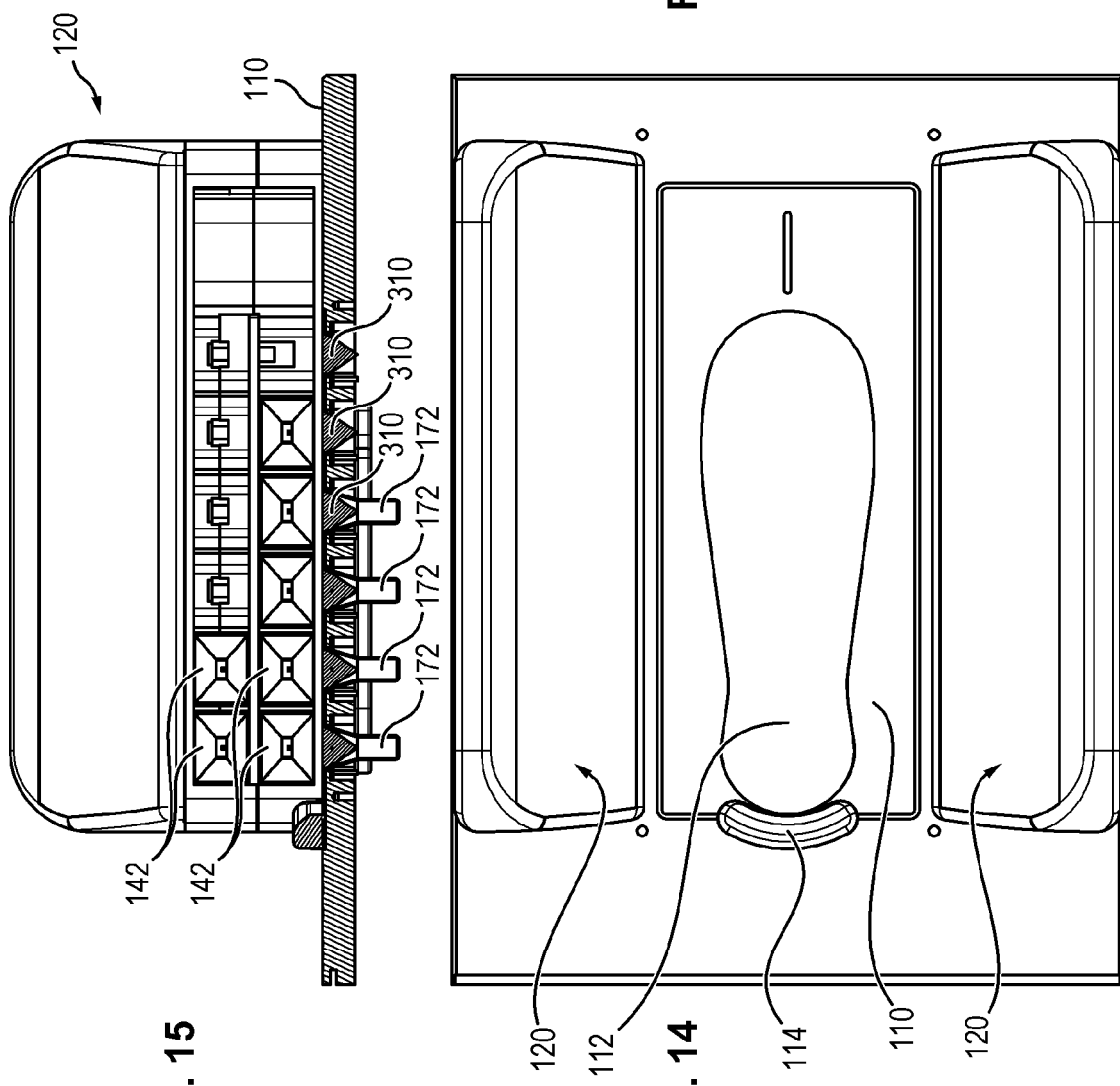

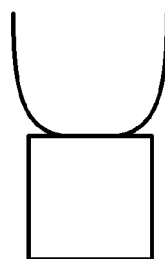 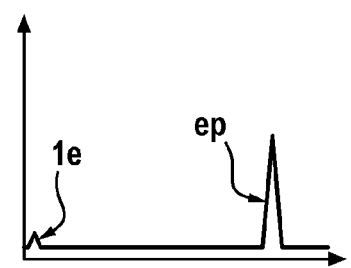 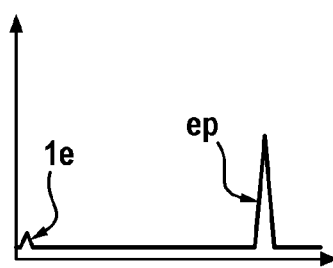
FIG. 20a  FIG. 20b  FIG. 20c  FIG. 20d
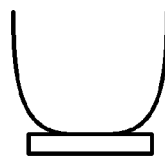 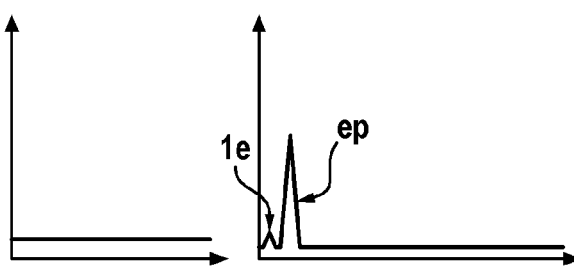 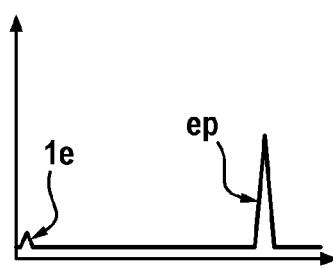
FIG. 21a  FIG. 21b  FIG. 21c  FIG. 21d
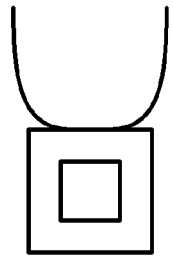 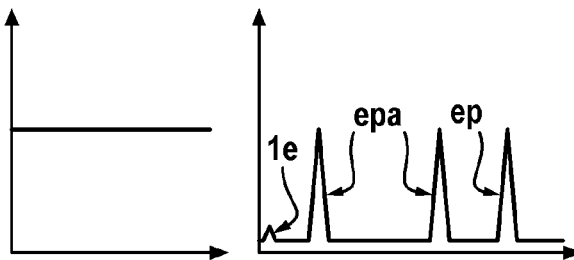 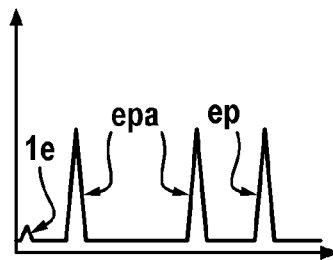
FIG. 22a  FIG. 22b  FIG. 22c  FIG. 22d
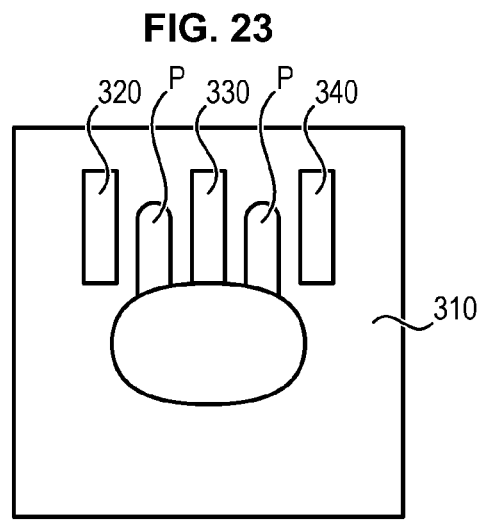
FIG. 23

SHOE ANALYZER 5BIS CAPACITIVE

TECHNICAL FIELD

The present invention relates to the field of detectors designed for detection of unauthorised objects or substances in a protected access zone.

BACKGROUND

Today it seems necessary to reliably control attempts at introducing or removing some products, for example but not exclusively explosive substances, to or outside of a sensitive zone.

The pertinent problem covers a very wide range of situations which especially encompass and not limitedly attempts to introduce products to a protected zone, such as a shop, a school, a train station, a public or private institution, or the attempt to remove products to outside a defined perimeter, for example in the event of theft from a company or on a protected site.

It eventuates these days that individuals who try to fraudulently remove a product from a protected zone or who try to introduce such a product, often use shoes to conceal the product in question.

This phenomenon seems due essentially to the fact that this zone is not easy to control visually or by manual handling.

SUMMARY

The applicant has already proposed devices of the type illustrated in the attached FIG. 1, which comprise a frame 1 having:
- a support base 10 formed by a rectangular tray in the form of a step whereof the plane upper surface comprises a diagram or footprint 12 and a stop 14 intended to meet and position a single foot of an individual covered by a shoe,
- two symmetrical lateral panels 20 which house detection means, and
- an information module 30.

Examples of the device illustrated in FIG. 1 are mentioned in documents FR 2860631, EP 1574879, FR 2889338 and FR 2911212.

The abovementioned detection means described in those documents can be formed from windings for detection of metals, sampling means, for example in the form of suction nozzles, for the sampling of steam or traces of particles, for example narcotics or explosives, analysis means based on nuclear magnetic resonance comprising for example Helmholtz coils, or even analysis means of complex impedances or detectors of radioactive radiation.

Despite the progress contributed by the devices described in the above documents, on some sensitive sites there is still a restriction on inviting people leaving the site or accessing the site to remove their shoes so as to try to improve inspection. But despite constraints and discomfort resulting from such a situation, visual examination of the removed shoe does not always fully secure inspection. The personnel involved cannot in fact determine if an object or a substance is camouflaged in an internal cavity not directly accessible to the shoe, especially the sole of the latter.

The aim of the present invention consequently is to propose novel means for improving the reliability of detection of objects, products or substances likely to be camouflaged in a shoe.

This aim is achieved in terms of the present invention by a device which comprises a combination of:
- a support base designed to receive at least one foot covered by its shoe, of an individual to be controlled,
- microwave sender means and microwave receiver means intended to be placed respectively on either side of the sole of the shoe,
- measuring means of the width of an element inserted in between the microwave sender/receiver means,
- analysis means of at least one parameter of the transmission time between the microwave sender/receiver means and/or of the amplitude of the signal transmitted between the microwave sender/receiver means, and
- standardisation means of the abovementioned analysis relative to a size unit of standard width, on the basis of the width obtained from the width-measuring means.

According to other advantageous characteristics of the invention:
- the frequency of microwaves emitted by senders is in the 5 GHz-30 GHz range, advantageously 12 GHz-20 GHz,
- the device comprises a plurality of microwave sender/receiver means distributed over the length of the support base,
- the measuring means of the width of the element inserted between the microwave sender/receiver means comprise infrared sender/receivers adapted to measure the time of two-way propagation between an infrared sender and the associated infrared receiver,
- the device comprises a plurality of infrared sender/receiver means,
- the device also comprises measuring means of the electrical capacity formed between the lower surface of the sole and the foot, or essentially of the electrical capacity formed by the sole of a shoe placed on the support base, to determine the thickness of this sole,
- the device also comprises means, preferably based on microwaves, adapted to detect stratification by vertical stacking in the sole by detection of successive echoes following emission of waves towards the sole,
- the device comprises adapter microwave coupling means, inserted in between the microwave transducers and a plate foot support,
- the adapter means comprise a pyramid engaged in each cone associated with a microwave transducer, comprising material with the plate foot support,
- the device comprises standardisation means of the signal originating from the detection means of vertical stratification, on the basis of a signal representative of the estimated height of the sole,
- the device comprises handles placed in the upper part of panels attached to the support base,
- said handles comprise electrodes,
- an electric generator is provided, placed in series of said handles and electrodes placed on the support base,
- the electric generator is adapted to generate voltage of the order of 1 volt,
- the microwave sender means and the associated microwave receiver means placed respectively on either side of the sole of the shoe are adapted to detection on receiver means of the signal coming from a sender means placed directly opposite and of the signal coming from sender means placed obliquely relative to the receiver means, the device comprises several series of detection means, each comprising several detection means distributed geographically similarly for all said series of detection means, the support base comprises a tray in the form of a step coated with a shoe positioning marker and two lateral panels, the base is preferably adapted to receive a single foot of the individual being tested, the device also comprises auxiliary analysis means selected in the range comprising metal-detection windings, sampling means of steam or traces of particles, analysis means of nuclear magnetic resonance type, analysis means of complex impedance and/or radioactive radiation detector means.

The invention also relates to a method for analysis of signals coming from the different means according to the present invention for generating an alarm in case of detection of an anomaly.

According to a first advantageous characteristic of the method of the invention, the method comprises at least one standardisation step of the amplitude of resulting signals, for example the amplitude of microwave absorption by a horizontal sole band or the microwave propagation time in such a horizontal sole band, as a function of a second measurement, for example measurement of sole width, or even for example of the temporal distribution of echoes spreading vertically as a function of measurement of height of the sole.

According to another advantageous characteristic of the method of the invention, the method comprises exploitation of at least two of the following measurements: measurement of the microwave absorption amplitude by a horizontal band of the sole, measurement of the microwave propagation time in a horizontal band of the sole, measurement of the width of a horizontal band sole, measurement of the height of the sole by means of capacitive means or by analysis of an image taken by an imaging system, detection of vertical stratification of a sole by detection of microwave reflections injected vertically into the sole.

DESCRIPTION OF THE DRAWINGS

Other characteristics, aims and advantages of the present invention will emerge from the following detailed description and with respect to the attached diagrams given by way of non-limiting examples and in which:

FIG. 3 illustrates a view similar to FIG. 2 and illustrates the general structure of microwave sender/receiver means according to the present invention intended to be arranged on either side horizontally of a shoe sole, FIG. 4 illustrates a variant embodiment in accordance with the present invention of microwave sender/receiver means illustrated in FIG. 3, FIG. 13 illustrates a partial view in perspective of the base of a system in accordance with the present invention, FIG. 14 illustrates a plan view of a system in accordance with the present invention, FIG. 15 illustrates a partial longitudinal section of a system in accordance with the present invention, FIG. 16 illustrates a partial transversal section of a system in accordance with the present invention, FIGS. 20a-20d illustrate standardisation of the signal obtained leaving a vertical detector for a high sole, FIGS. 21a-21d illustrate standardisation of the signal obtained leaving a vertical detector for a low sole, FIGS. 22a-22d illustrate standardisation of the signal obtained leaving a vertical detector for a high sole with a foreign body, and FIG. 23 schematically illustrates a variant embodiment in accordance with the present invention according to which the support base is designed to receive simultaneously the two feet of a test individual.

DETAILED DESCRIPTION

Figure 1:
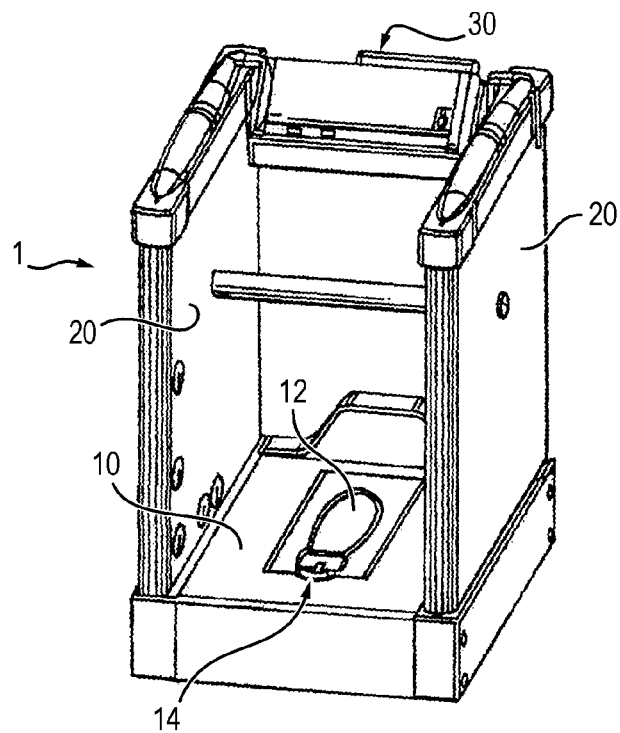
FIG. 1 previously described illustrates a detection device in accordance with the prior art.
Figure 2:
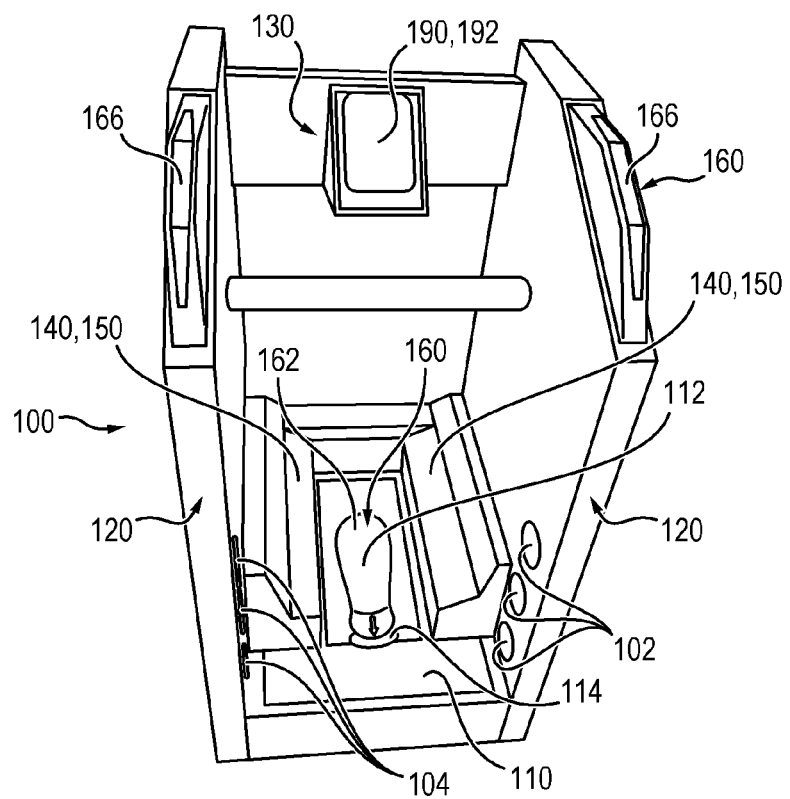
FIG. 2 illustrates the general structure of a device in accordance with the present invention.

FIG. 2 and following show the general structure of a device as per the documents described previously FR 2860631, EP 1574879, FR 2889338 and FR 2911212. For this reason, the general structure of the device shown in FIG. 2 and following will not be described in detail hereinbelow.

It is recalled however that FIG. 2 and following show a device comprising a frame 100 comprising:

a support base 110 formed by a rectangular tray in the form of a step whereof the plane upper surface comprises a diagram 112 and a stop 114 intended to receive and position a single foot covered by a shoe, two lateral panels symmetrical 120 which house detection means, and an information module 130.

The device shown in FIG. 2 and following can be congruous as to its geometry, its dimensions, the outline of the positioning marker 112, the stop 114, the nature of messages displayed on the module 130, the arrangements described in the abovementioned documents.

The same applies for any accessories of the type of random sorting means of individuals subjected to analysis, frequencies used for detecting metals and/or any sensor for placing a shoe on the diagram 112 or again installation of a foot against the two panels 120 to initiate processing.

Without this arrangement being limiting, such detection means of the installation of a shoe in the device 100, more precisely on the marker 112, against the stop 114, can be formed by a plurality of photoelectric cells 102, 104 arranged respectively opposite on the two panels 120 such that an optical beam emitted by an emitting cell 102 in the direction of an opposite receiving cell 104 is interrupted during the placing of a foot.

As is evident in FIG. 2 and following, the device in accordance with the invention also comprises additional detection means 140, 150 and 160 on the support base 110.

More precisely according to the embodiment of the invention illustrated in FIG. 2 and following, microwave sender/receiver means 140 are provided at the level of the junction interface between the upper surface of the support base 110 and the lateral panels 120, for measuring transmission time and measuring absorption, associated with infrared sender/receiver means 150 for measuring the width of the part of the shoe inserted in between the microwave sender/receiver means 140.

Capacitive measuring means 160 are also preferably provided. These comprise electrodes 162 placed at the level of the footprint 112 and electrodes 166 placed in the upper part of the panels 120. They will be defined in more detail hereinbelow.

The structure of the microwave sender/receiver means 140 will be described first.

As shown in FIG. 3, microwave sender means 142 are preferably provided of a side of the base 110 in the lower part of a panel 120 and associated microwave receiver means 144 on the side opposite the base, that is, in the lower part of the second lateral panel 120.

The sender means 142 and the receiver means 144 respectively associated are aligned horizontally.

The frequency of microwaves emitted by the senders 142 is preferably in the range of 5 GHz to 30 GHz, advantageously in the range of 12 GHz to 20 GHz.

Even more precisely, according to the invention several senders 142 and several receivers 144 are preferably provided, respectively associated in pairs, distributed at the base of panels 120 over the depth of the device.

According to the invention, a plurality of microwave senders 142 and microwave receivers 144 is preferably provided adapted to cover three zones separate respectively corresponding to the heel, the arch and the front sole of a shoe.

According to the particular embodiment shown in the attached figures, six senders 142 of a side of the base and six associated receivers 144 on the side opposite the base are provided. The senders are referenced 142a to 142f and the receivers are referenced 144a to 144f in FIG. 12.

The six senders 142 and six receivers 144 are distributed in the form of an aligned horizontal row 145, 146. If needed, as illustrated in FIG. 4 at least two superposed rows 145 and 146 can be provided, each comprising a plurality of senders 142, respectively receivers 144, for example two rows 145 of six senders 142 and two rows 146 of six receivers 144.

The distribution of the initiation of microwave elements associated with respective focusing cones 149 forming respectively sender 142 of a side of the base and receiver 144 on the opposite side can be ensured by adapted switches.

The expert will understand that microwaves emitted by a sender 142 of a side of the base passes through the sole of a shoe placed on the footprint 112 before reaching a receiver 144 placed opposite.

The dielectric characteristics of the sole inserted in between a sender 142 and a receiver 144 influence the transmission time of microwaves and the absorption of the latter.

Analysis of the delay between the emission by a sender 142 and receipt at the associated receiver 144, and the amplitude of microwaves received at a receiver 144 relative to the reference emitted by the associated sender 142, can show the dielectric characteristics of the inserted sole.

Comparison with cartography of reference materials and analysis of the delay and amplitude of microwaves received on a receiver 144 can characterise the nature of the product comprising the sole of the relevant shoe.

In particular, explosives having a characteristic signature in transmission time and absorption can be characterised.

Figure 12:
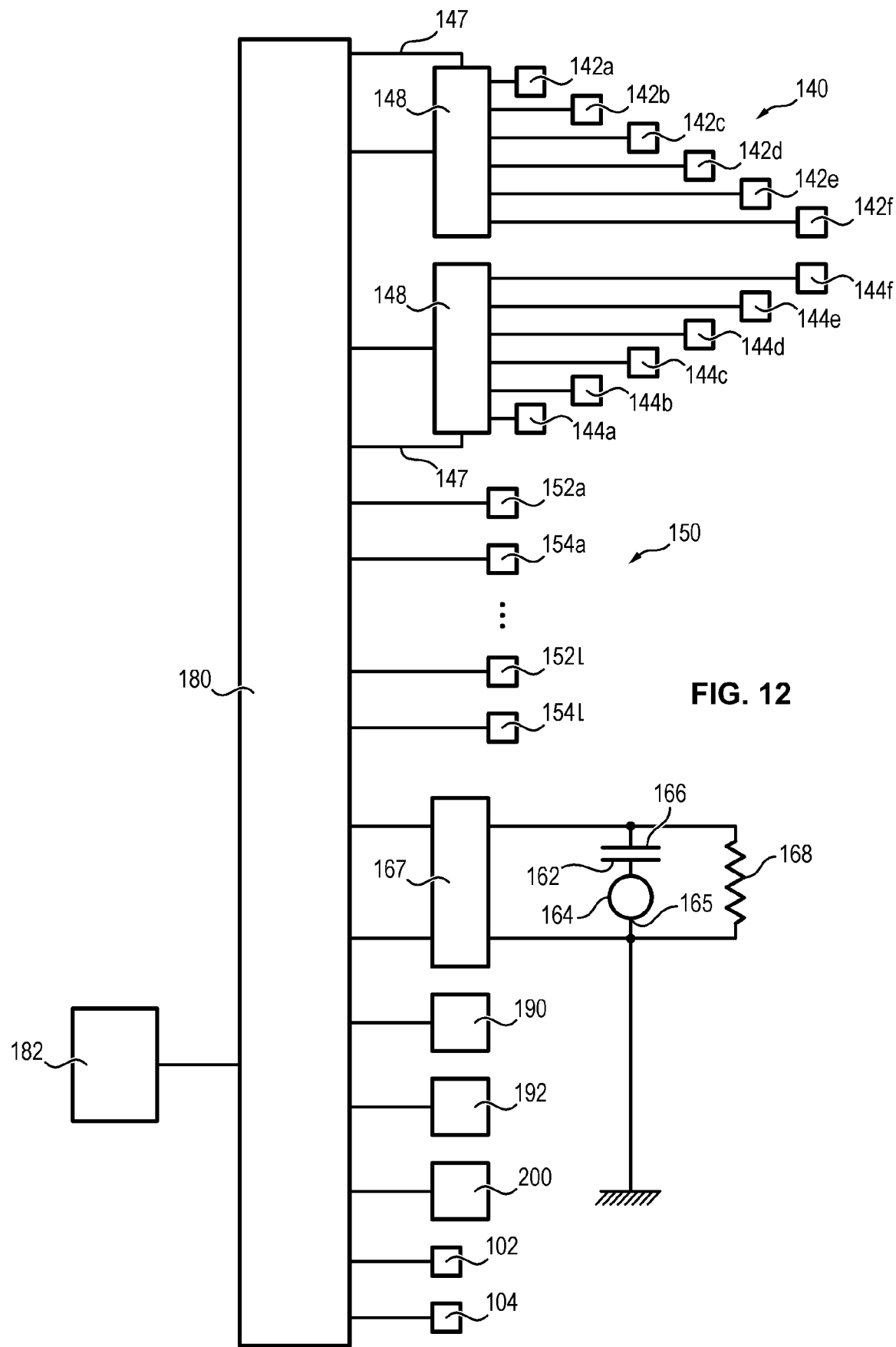

Control of microwave senders 142 and microwave receivers 144, analysis of the delay in transmission at the level of each receiver 144 and the abovementioned comparison, can be done by a processor referenced 180 in FIG. 12. This FIG. 12 shows at 182 a memory associated with the processor 180 which contains the preset cartography of reference materials.

As shown in FIG. 3, the analysis method can take into account the microwaves received directly by a receiver cone 149 placed rigorously opposite a sender 142 (shown at «D» in FIG. 3), but also as an option the microwaves coming from an oblique sender cone 142 (shown at «O» in FIG. 3).

This arrangement in accordance with the invention intended to take into account on a receiver 144 not only the signal of a sender 142 placed directly opposite, but also the signal coming from sender means 142 placed obliquely relative to the receiver means 144, applies not only for oblique receiver means in the horizontal direction, but also for oblique receiver means in the vertical direction.

Inclusion of the signal coming from an oblique sender means in the vertical direction, that is, coming from sender means located at a height different to the obliquely associated receiver means, or at a height greater than that of the receiver means or at a height lower than latter, produces information on the height of the sole of the shoe being tested. In fact not only when the sole has a height less than that of the sender 142 and receiver 144 couples aligned horizontally which are the highest, these high receivers 144 receive a direct signal different to the direct horizontal signal received by lower receivers 144, but also the associated pairs of obliquely vertical sender 142 and receiver 144 couples generate a signal proportional to the height of the sole being tested, since the volume of substance of the sole inserted in between such an oblique sender 142 and receiver 144 vertically depends directly on the height of the sole.

Figure 5:
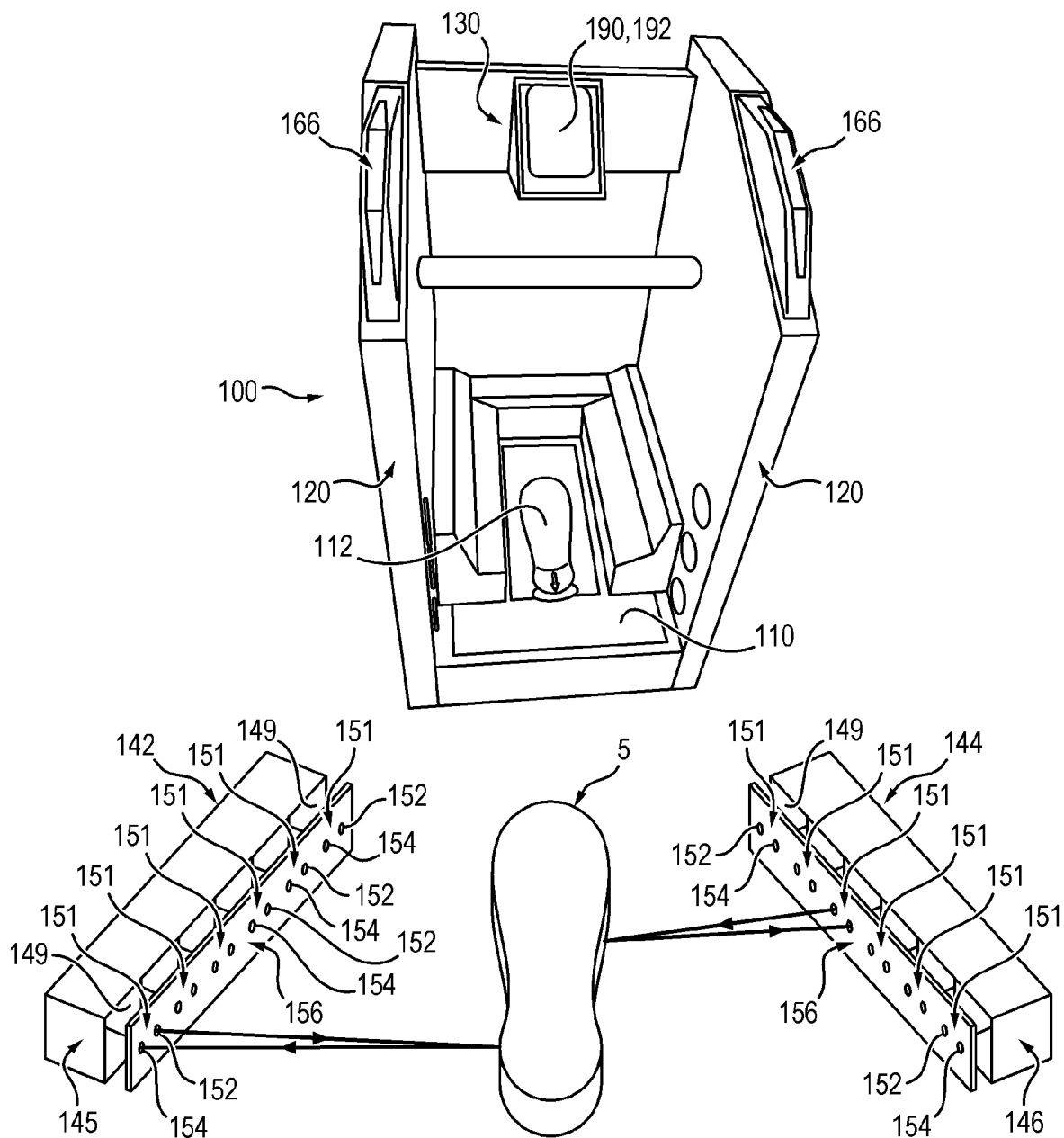
FIG. 5 illustrates a view similar to FIG. 2 and more precisely illustrates the structure of infrared sender means according to the present invention for detection of the width of the element inserted in between the microwave sender/receiver means, FIG. 6 schematically illustrates the structure of electrodes provided on a footprint placed on the upper surface of a base.

As indicated previously in terms of the invention, as illustrated in FIGS. 5 and 12, measuring means of the width of the element S inserted in between a microwave sender element 142 and a microwave receiver element 144 are also provided.

These width-measuring means are preferably formed based on infrared sender/receiver means.

In terms of the invention, as illustrated in FIG. 5 a plurality of pairs 151 of sender means 152 and receivers respectively associated 154 is provided, to each side of the base 110.

In other terms a first pair of infrared transducers is provided for example comprising sender means 152 and respectively associated receiver means 154 on a first side of the base 110, and opposite, a second pair of transducers infrared comprising other sender means 152 and other respectively associated receiver means 154 on the second side opposite the base 110.

The device also comprises analysis means of the two-way time of infrared between a sender 152 and the associated receiver 154. The infrared emitted by a sender 152 is reflected on the external surface of the sole S before being recovered by the adjacent associated receiver 154. The analysis means of the two-way time of the infrared between a sender 152 and the associated receiver 154 are preferably formed by the processor 180.

The associated infrared senders 152 and infrared receivers 154 are preferably placed on a card 156 transparent to microwaves, placed opposite the exit mouth of the abovementioned cones 149.

Preferably, the gap of infrared senders 152/receivers 154, that is, the distance separating two such pairs of senders 152 and receivers 154, is identical to that of microwave senders 142/receivers 144.

In other terms, an infrared sender 152/receiver 154 couple associated respectively with each microwave sender 142 and each microwave receiver 144 is preferably provided to each side of the base 110.

Even more precisely the infrared senders 152/receivers 154 couples preferably have the same distribution as the pairs of microwave senders 142/receivers 144. Typically, a pair of infrared senders 152/receivers 154 is provided opposite each pair of microwave senders 142/receivers 144. This arrangement ensures that the zone targeted by a pair of infrared senders 152/receivers 154 is the same as that for a pair of respectively associated microwave senders 142/receivers 144 and consequently allows simple, reliable and rigorous correlation between the information coming from a pair of infrared senders 152/receivers 154 and that coming from a pair of respectively associated microwave senders 142/receivers 144.

Six pairs of senders 152 and receivers 154 are preferably provided on a first side of the sole and six pairs of senders 152 and receivers 154 opposite on the second side opposite the sole.

The infrared senders are referenced 152a to 152l and the infrared receivers are referenced 154a to 154l in FIG. 12.

Given the width of the sole S inserted in between a microwave sender 142 and the associated microwave receiver 144, via infrared measurement, the device in accordance with the invention can undertake standardisation per size unit of the transmission delay and amplitude of the microwave signal received on a receiver 144.

The abovementioned standardisation can be done by the processor 180.

In other terms, before standardisation a zone A of a sole having a double width of a zone B, of identical material, in principle has a transmission delay and double attenuation of the zone B. After measuring of the widths of zones A and B and standardisation of delay and absorption, having material identical, the two zones A and B will all the same have identical characteristics in terms of transmission delay of microwaves and absorption.

Also, zones A and C of a sole formed at least in part of different materials and therefore having different properties in terms of microwave transmission, for example in the case of a zone C housing an unauthorised object, will have different responses as to transmission delay and absorption.

Figure 9:
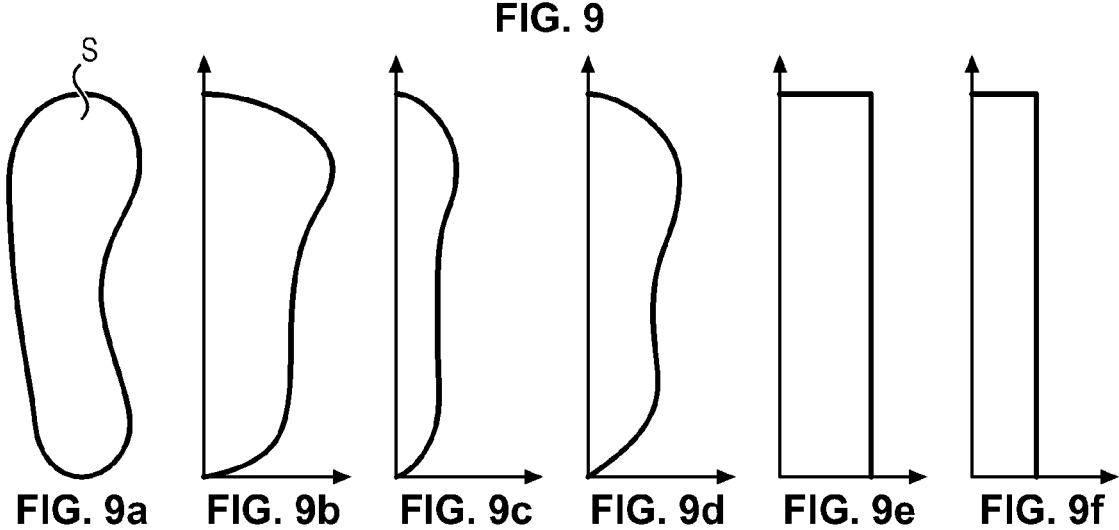
Figure 10:
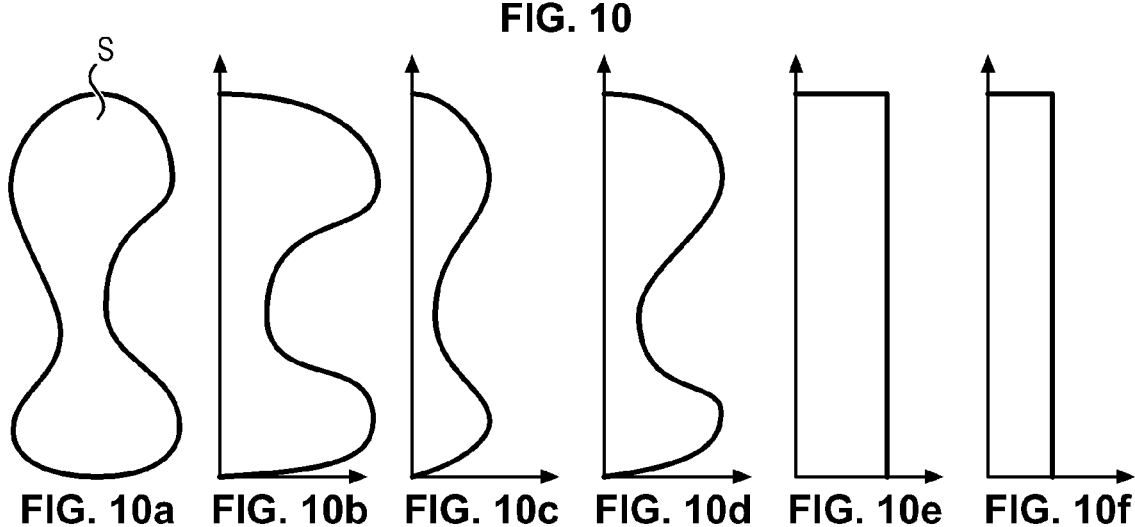
Figure 11:
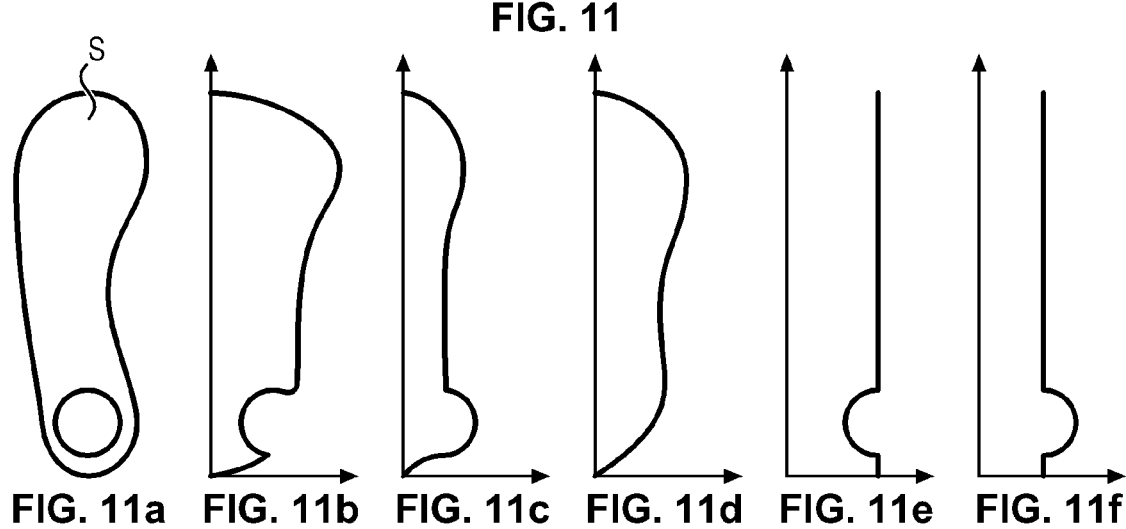
FIGS. 11a-11f illustrate views respectively similar to FIGS. 9a-9f for a shoe sole which houses an unauthorised body, FIG. 12 schematically illustrates an electric control circuit of the device in accordance with the present invention.

This is illustrated in FIGS. 9 to 11.

FIG. 9a schematically illustrates the profile of a shoe sole S formed from homogeneous material.

FIG. 9b illustrates the transmission time curve measured by means of microwave senders 142/receivers 144, while FIG. 9c illustrates the absorption curve measured by means of the same microwave sender 142/receiver 144 means when the abovementioned shoe sole S is inserted in between the sender means 142 and the receiver means 144. Since the sole S is made of homogeneous material, logically the curves of FIGS. 9b and 9c are overall homothetic with the thickness of material of the sole traversed by the microwaves.

FIG. 9d illustrates the measurement curve of width obtained by means of infrared sender/receiver means on the sole S.

FIGS. 9e and 9f illustrate curves of transmission time and absorption based on the curves of FIGS. 9b and 9c, but after standardisation per size unit on the basis of the curve of FIG. 9d. As is evident from FIGS. 9e and 9f, since the material of the sole S is homogeneous the standardised curves of FIGS. 9e and 9f are overall constant.

Standardisation easily determines that the sole is made of homogeneous material.

FIGS. 10a-10f illustrate views respectively similar to FIGS. 9a-9f for a different profile of shoe sole. The profile of transmission delay and absorption curves shown in FIGS. 10b and 10c differ consequently from FIGS. 9b and 9c and overall remain homothetic to the thickness of material of the sole traversed by the microwaves.

But in the case of a sole composed of homogeneous material, as is evident in FIGS. 10e and 10f, the standardised transmission delay and absorption curves return to constant amplitude.

FIGS. 11a-11f illustrate views respectively similar to FIGS. 9a-9f for a shoe sole which houses an unauthorised body C having delay characteristics of microwave transmission and microwave absorption different to that comprising the sole S.

From comparative examination of FIGS. 11b and 11e, respectively FIGS. 11c and 11f, it is clear that standardisation clearly reveals any anomaly due to the presence of the unauthorised body C. Comparison of the amplitudes of resulting standardised curves with a library of pre-recorded characteristics of preferred specific products identifies these products.

Information available on the receivers 144 also detects microwave echoes sent back horizontally to interfaces of the sole and detects stratifications formed by juxtaposition in the horizontal direction of layers of materials having different properties with respect to the propagation of microwaves, resulting for example in the presence of pockets within the sole.

As indicated previously, according to the invention measurement means 160 of the thickness of the sole of the shoe are preferably also provided.

According to a first variant in accordance with the invention, these measuring means 160 are of capacitive type.

Figure 6:
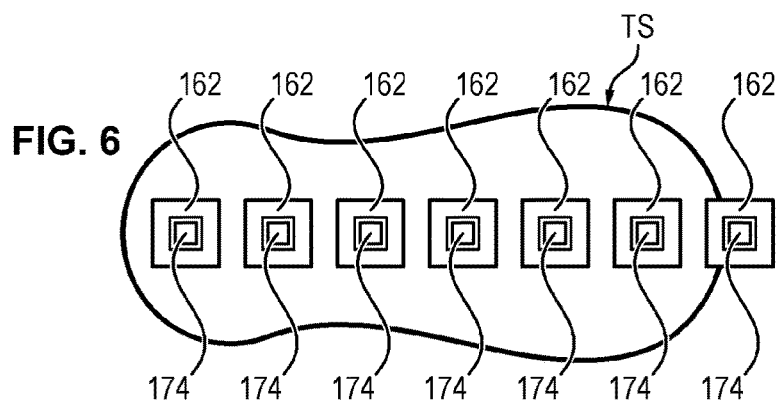

As illustrated in FIG. 6, according to the invention electrodes 162 are preferably provided on the upper surface of the footprint 112, flush with the upper surface of the footprint 112 or slightly projecting above this footprint 112.

Even more precisely, different distinct zones of electrodes 162 are preferably provided coinciding as to their location on the depth of the device with the different microwave detection zones. At least six electrode zones 162 are preferably provided distributed over the depth of the base 110.

This arrangement ensures that the zone located opposite an electrode 162 is the same as that for a pair of respectively associated microwave senders 142/receivers 144 and consequently enables simple, reliable and rigorous correlation between information coming from capacitive measurement of thickness and that coming from a pair of respectively associated microwave senders 142/receivers 144.

Each electrode 162 can be formed by a plurality of points or an equivalent form, for example in the form of pins.

But each electrode 162 preferably has an annular form coaxially enclosing the cone 174 of a microwave sender 172, the function of which will be explained hereinbelow, as illustrated in FIG. 6.

The electrodes in the form of a ring 162 are isolated from the abovementioned cones of the microwave senders 172 so as not to disrupt the respective measurements of these different means.

By way of non-limiting example the external dimensions of the electrodes 162 can typically be of the order of 30 mm×30 mm, while the width of the cones 174 at the level of their greatest width is between 10 and 15 mm, the interval between the electrodes 162 and the cones being at least equal to 1 mm.

Figure 7:
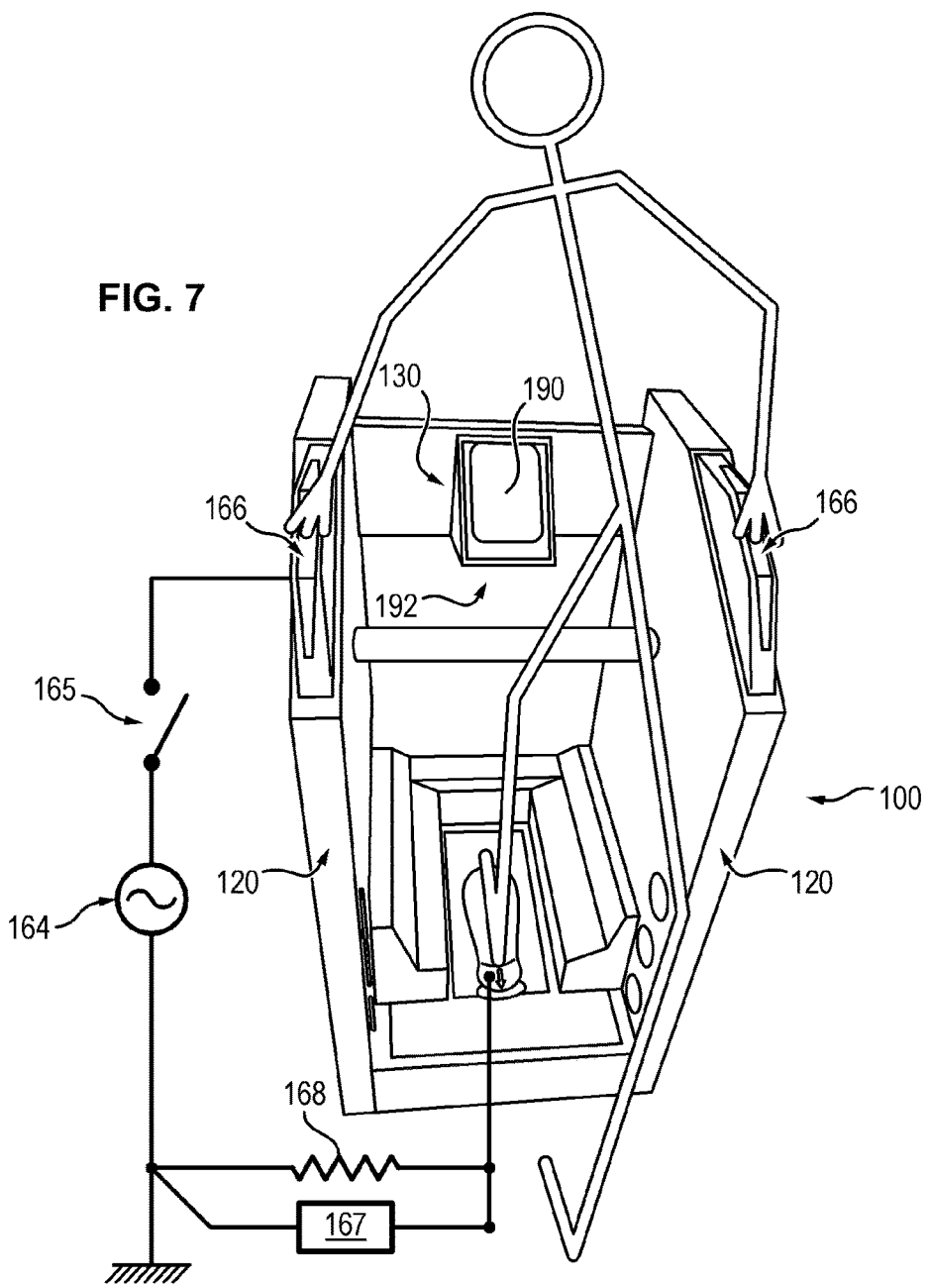
FIG. 7 illustrates a view similar to FIG. 2 and illustrates the operation of the device in capacitive measuring.

The device also comprises an electric generator 164, typically a generator of alternating current, shown in FIG. 7, connected by means of an interrupter 165 in series of the abovementioned electrodes 162 and handles 166 forming electrodes provided on the upper surfaces of the lateral panels 120 and intended to be held by an individual being tested.

The electrodes 162 provided at the level of the footprint 112 and the handles 166 forming electrodes provided at the level of the upper surfaces of the lateral panels 120 can form the object of many variant embodiments. They can be formed by adapted electrically conductive ranges, for example metallic ranges or all equivalent means. According to a particular embodiment these electrodes are formed by material comprising electrically conductive particles, for example nanotubes, integrated to form electrodes. Such a realisation of electrodes 166 by integration of electrically conductive particles in the mass of the lateral panels 120, and not in the form of a metallic element superposed on the upper edge of the panels 120, ensures the individuals being tested who are asked to place their hands on the panels 120 by avoiding giving them the sentiment of contacting ranges placed under electrical voltage.

The electric generator 164 is adapted to emit alternating voltage typically of between 0.1V and 10V, advantageously of the order of 1 volt, at an impedance of 10 kΩ, and at a frequency preferably between 1 and 10 kHz.

The invention is not however limited to this particular voltage value, or frequency.

The capacity defined between the electrodes 162 and 166 depends essentially on the height or thickness of the sole of the shoe. The value of the impedance of this capacity shown by the sole is also high relative to that of the human body inserted in between the same electrodes 162 and 166.

The interrupter 165 is closed when the aim is to perform measurements.

The measurement of the capacity between both the electrodes 162 provided on the upper surface of the base 110 and therefore subjacent to the lower surface of a sole and also the electrodes 166 provided on the upper surfaces of the panels 120, on which the hands of the user being tested rest, can be taken by any appropriate means 167 known to the expert, linked to the processor 180. This measurement determines the capacity of the sole and consequently its thickness.

Typically this measurement can be done by measuring the voltage at the terminal of resistor 168 placed in series of electrodes 162 and 166, in a dividing bridge, by means of an analog/digital converter integrated into the means 167. Since the impedance of the human body is very low relative to that due to the capacity of the sole, the voltage sampled at the terminals of the resistance 168 is directly representative of the height of the sole.

Given the thickness of the sole, this refines the reliability of the characterisation of the material analysed from the microwave sender/receiver means 140.

Of course, the present invention is not limited to the embodiments which have just been described, but extends to any variant in accordance with its essence.

Figure 8:
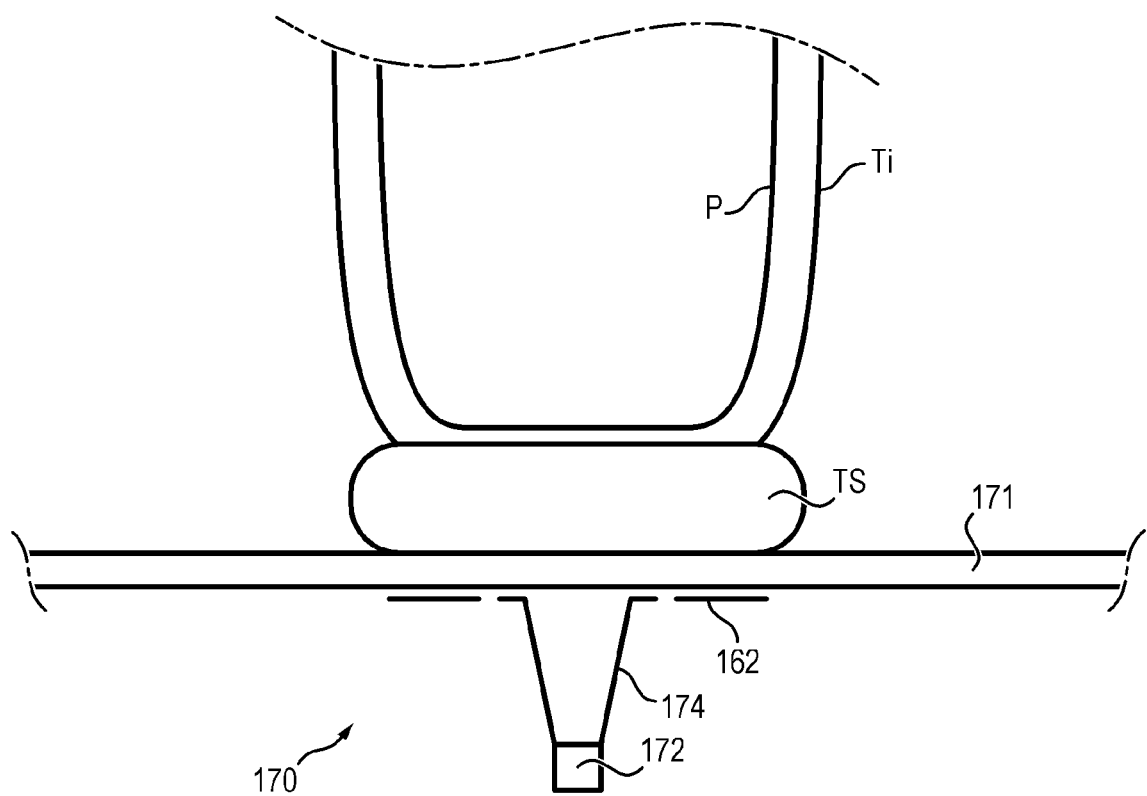
FIG. 8 illustrates a schematic view of a particular embodiment of means based on microwaves, adapted to detect stratification by vertical stacking, in the sole, by detection of successive echoes following emission of waves towards the sole, FIGS. 9a-9f schematically illustrate the impact of standardisation in accordance with the present invention of the signal coming from the microwave sender means and microwave receiver means placed respectively on either side of the sole of the shoe, FIG. 9a schematically illustrating the profile of a shoe sole formed from homogeneous material, FIG. 9b illustrating the transmission time curve measured by means of microwave senders/receivers, FIG. 9c illustrating the absorption curve measured by means of the same microwave sender/receiver means, FIG. 9d illustrating the measurement curve of width obtained by means of infrared sender/receiver means and FIGS. 9e and 9f illustrating transmission time and absorption curves based on the curves of FIGS. 9b and 9c, but after standardisation per size unit on the basis of the curve of FIG. 9d, FIGS. 10a-10f illustrate views respectively similar to FIGS. 9a-9f for a different profile of a shoe sole.

Preferably as illustrated in FIG. 8 the device in accordance with the present invention also comprises means 170 based on microwave senders/receivers, adapted to detect microwave echoes of microwaves emitted vertically under the footprint 112, in the direction of the foot of an individual. In FIG. 8 171 is referenced as a support layer of a laminate adapted to resist any type of heel or sole TS, 172 a microwave sender adapted to emit microwaves vertically upwards, 174 an associated guide cone, 162 an electrode previously described used for capacitive measuring, P the foot of an individual and Ti the rod of the shoe.

The means 172 alternatively forms sender and receiver or alternatively a couple of adjacent senders and receivers associated with each cone 174 can be provided. The receiver means integrated in this way detect microwave echoes on the different interfaces or stratifications resulting from vertical stacking of successive layers having different propagation properties with respect to microwaves, between the lower surface of the sole or heel TS and the upper surface of the sole which corresponds to the lower surface of the foot P.

The means 170 detect the presence of pockets or particular material within the mass of the sole or heel TS.

The frequency of microwaves emitted by the senders 172 is preferably in the range of 5 GHz to 30 GHz, advantageously in the range of 12 GHz to 20 GHz. It is advantageously separate from the frequency of the sender means 142.

Even more precisely, according to the invention several senders 172 and receivers are preferably provided respectively associated in pairs, distributed under the footprint 112 over the depth of the device.

According to the invention, a plurality of microwave senders 172 and receivers is preferably provided associated and adapted to cover respectively at least three separate zones corresponding to the heel, the arch and the front sole of a shoe.

According to a preferred embodiment, six senders 172 are provided distributed over the length of the footprint 112.

The associated senders 172 and receivers can be aligned or be arranged according to any other modality, for example alternately, to optimally cover all ranges of size of existing shoe soles.

Preferably distribution of the senders/receivers 172 over the depth of the device is also identical to that of the senders 142 and receivers 144, such that the zone of a sole covered by a sender/receiver 172 assembly on the depth of the device is the same as that covered by a sender 142/receiver 144 assembly.

This arrangement ensures that the zone targeted by a pair of sender/receivers 172 working in vertical direction for measurement in thickness of the sole is the same as that for a pair of respectively associated microwave senders 142/receivers 144 and consequently enables simple, reliable and rigorous correlation between information coming from a pair of sender/receivers 172 and that coming from a pair of respectively associated microwave senders 142/receivers 144.

The exploitation of signals coming from the senders/receivers 172 can form the object of many embodiments.

According to a first embodiment, the signals coming from the senders/receivers 172 are compared to a signal representative of measurement of the thickness of the sole, for example the signal representative of the thickness of the sole obtained by means of the electrodes 162 and of the corresponding capacitive measurement. It can however be a signal representative of the thickness of the sole obtained by any other means.

The sender/receiver 172 assemblies detect echoes sent back by the interfaces of substance resulting from vertical stacking within the sole and detect the height of these interfaces by measuring the transmission and receipt time of these echoes.

The main echo is that produced by the lower surface of the foot which corresponds to the upper surface of the sole.

Initial direct comparison of the time of receipt of this main echo with the sole thickness signal obtained by capacitive measurement produces a first simple test.

In fact for a sole of minimal thickness, the system expects the receipt of a main echo on the lower surface of the foot, after a short transmission and reflection time.

Inversely for a sole of considerable thickness, the system expects the receipt of a main echo on the lower surface of the foot, after a longer transmission and reflection time.

But if the system detects, while the capacitive measurement indicates a sole of considerable thickness, a main echo after a short transmission and reflection time, the presence of a pocket or a foreign body within the sole can be suspected.

Standardisation of receipt times of the echoes on the receivers 172 as a function of the thickness of the sole makes detection of anomaly on a sole easy.

The expert will in fact understand from examination of attached FIGS. 20, 21 and 22 that if it can be difficult before standardisation to exploit the receipt time of different echoes, since as this appears in FIGS. 20c, 21c and 22c, the real instants of receipt of echoes are influenced at the same time by the thickness of the sole and by the defects of evenness of the sole, after standardisation as a function of the height of the sole, and therefore once the time of receipt of echoes freed of the influence of the height of the sole, the temporal distribution of the echoes is directly representative of the vertical constitution of the sole.

Comparison of FIGS. 20d, 21d and 22d shows in fact that the convergence of the first echoes 1e, in principle of low amplitude, resulting from reflection on the lower surface of the sole, and expected main echoes ep is easy. From there parasite echoes epa resulting from vertical stratification of the sole, due for example to the presence of a pocket or a foreign body, can also be easily detected.

In effect, for example FIGS. 21c and 22c show that parasite echoes epa can be combined with a main echo ep, before standardisation. But FIGS. 21d and 22d show that after standardisation parasite echoes epa are distinguished clearly from a main echo ep.

As illustrated in FIG. 2 and following, the device in accordance with the invention can also be fitted with a device 190 for taking photos, for example a camera, linked to a lighting system 192 for refining monitoring of the positioning of the foot on the base.

Such a camera can store a photograph of each shoe tested and in this way improve a database stored with characteristics of shoes, specific to improving the reliability of later measurements.

It can also be used to aid measurement of the geometry of the sole, in particular of the width of the sole, and contribute to improving the reliability of detection.

Measurement of sole width obtained by pixel processing of the image sampled by the camera can be used by replacing measuring of the sole width performed by infrared the senders 152/receivers 154, or as a complement to the latter.

It has also been noted experimentally that some support interface plates making up the upper surface of the base 110 generate a significant echo on the vertical waves generated by the senders 172, likely to complicate analysis of signals obtained leaving the associated receivers.

To simplify signal processing and avoid energy losses due to these echoes and therefore improve measurement precision, in terms of the present invention it is also proposed to add an adapter for coupling of waves emitted by the senders 172, in said plate support 171.

Such an adapter is preferably formed from an assembly of blocks 310 in the form of a pyramid inserted respectively in each cone 174 of a sender 172.

The different pyramids 310 are preferably made of material on a common plate 171.

The arrangement of pyramids 310 on the plate 171 must of course respect the arrangement and distribution of the cones 174. So according to the illustration given in the attached FIGS. 17 to 19 six aligned pyramids are provided arranged according to spacing identical to that of the senders 172 and associated cones 174. This alignment arrangement is however not imperative, the essential being that the distribution of pyramids respects that of the cones 174.

The pyramids 310 and the plate 171 can be made by moulding, for example of polytetrafluoroethylene or polystyrene.

Figure 19:
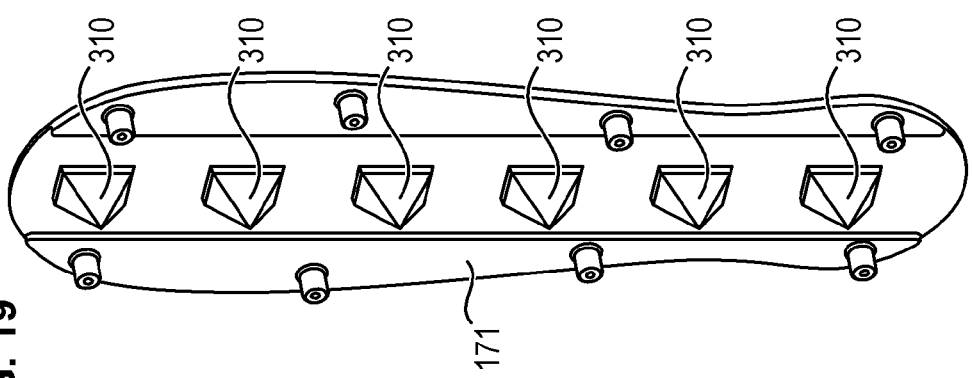
FIG. 19 illustrates a perspective view of microwave adapter coupling means in accordance with the present invention.
Figure 17:
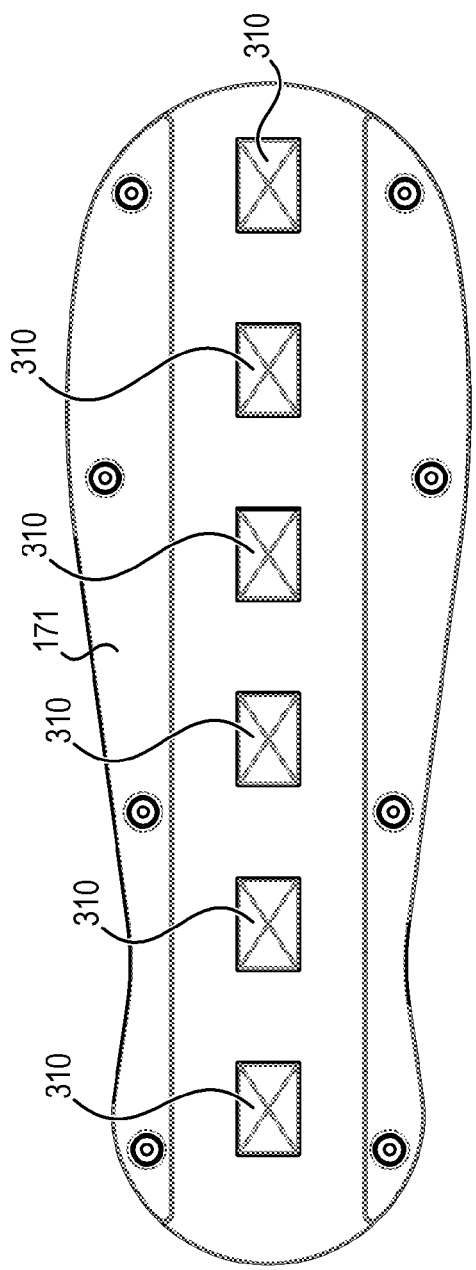
FIG. 17 illustrates a plan view of microwave adapter coupling means in accordance with the present invention.
Figure 18:
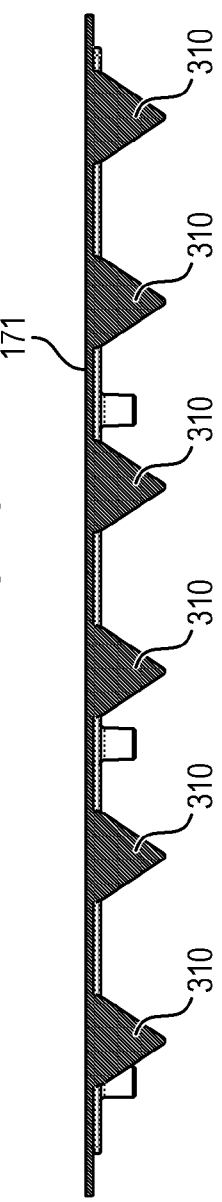
FIG. 18 illustrates a vertical section of microwave adapter coupling means in accordance with the present invention.

As per FIGS. 17 to 19 the pyramids 310 are more precisely formed on a sub-assembly of plate support 171 whereof the contour reproduces the geometry of a sole and serves as footprint 112 to impose precise positioning of the shoe. The invention is not however limited to this precise arrangement.

The points of the pyramids 310 are directed towards the senders 172. In this way the microwaves emitted by the senders 172 penetrate almost without reflection in the pyramids 310 by progressive coupling and spread in the latter, pass through the plate support 171, then reach the superposed sole.

According to the invention, the device can also comprise auxiliary detection means such as metal-detection windings, sampling means of steam or traces of particles, for example narcotics or explosives, especially based on suction nozzle, means by nuclear magnetic resonance, especially based on Helmholtz coils, analysis means of complex impedance and detector means of radio-active radiation. These additional measurement and detection means are shown under reference 200 in FIG. 12.

The combination of transversal or horizontal measurement obtained by means of the transducers 142, 144 and 152, 154 on the one hand and of the measurement in height or vertical obtained by means of the transducers 170 on the other hand, or by capacitive measurement or even by any equivalent means for example by analysis of the image taken by the camera 190, produces information on the volume of the base of the relevant shoe.

The combination of all the information obtained in terms of the invention also considers the large disparity of structures, compositions and geometries of commercially available shoes.

The expert understands in fact that all information obtained in terms of the invention (measurement of the microwave absorption amplitude by a horizontal band of the sole or of the propagation time of microwaves in such a horizontal band sole by way of means 142/144, measurement of the width of the corresponding horizontal band of sole by way of means 152/154 or 190, measurement of the height of the sole by way of capacitive means 162/166 or means 172/174), can be brought together and compared, at least in pairs, or even in their entirety to improve the reliability and coherence of results obtained, both as relates to the basic generation of detection of an anomaly and to providing more exact information relative the location, importance, geometry and nature of an obvious anomaly.

Execution of the present invention described previously in the context of a device whereof the bases have previously been described in documents FR 2860631, EP 1574879, FR 2889338 and FR 2911212, comprising a support base 10 formed by a step whereof the upper surface comprises a footprint 12 and a stop 14 intended to receive and position a single foot of an individual covered by a shoe.

But the invention is not limited to this particular embodiment. As shown in attached FIG. 23, the present invention can also apply to devices in which the support base is adapted to receive simultaneously the two feet P of an individual.

In this case it is however preferable, for allow detection respectively and individually on each of the two feet P of an individual being tested, to provide in projection on the upper surface of the base three blocks 320, 330 and 340 between which the two feet P must be positioned such that the central block 330 is placed between the two feet P, while the two lateral blocks 320 and 340 are arranged respectively on the exterior of the feet. The central block 330 houses detection means associated respectively with the blocks 320 and 340 to allow the abovementioned different measurements respectively on each of the two feet P. In this way the central block 330 in this case preferably houses sender means 142/receivers 144 for measuring the absorption amplitude of microwaves and time of propagation, as well as infrared transducers 152/154 for measuring the width of each of the two soles S separately.

The invention claimed is:

1. A detector device for detection of unauthorised objects or substances, comprising a support base to receive a shoe worn by an individual to be controlled;
   a pair of panels coupled to said support base;
   said support base including means for measuring electrical capacitance including at least one first electrode disposed on an upper surface of the support base and at least one second electrode disposed on a surface of the panels,
   wherein said means for measuring utilizes measured values obtained by said first and second electrodes to determine a height of a sole of said shoe placed on said support base using said measured electrical capacitance.

2. The device as claimed in claim 1, further comprising handles placed on an upper part of the panels provided on the support base.

3. The device as claimed in claim 2, wherein the handles comprise said at least one second electrode.

4. The device as claimed in claim 3, wherein each of said at least one second electrode is made from electrically conductive material provided on the upper part of the panels.

5. The device as claimed in claim 1, further comprising an electric generator connected in series between, on a one side handles provided on lateral panels, and on another side said at least one first electrode placed on the support base.

6. The device as claimed in claim 5, wherein each of the at least one first electrode placed on the support base is concentric to cones associated with microwave transducers adapted to generate microwaves vertically in the sole.

7. The device as claimed in claim 5, wherein the electric generator is adapted to generate voltage of between 0.1V and 10V.

8. The device as claimed in claim 1, further comprising at least one microwave sender means placed adjacent to one side of the support base, at least one microwave receiver means placed adjacent to a side of the support base opposite the one side such that the microwaves emitted by the microwave sender means pass through the sole of the shoe placed on the support base before reaching the associated microwave receiver means, and at least one measurement means of the width of the element inserted in between the microwave sender means and receiver means, comprising infrared senders/receivers adapted to measure the time of two-way propagation between an infrared sender and an associated infrared receiver.

9. The device as claimed in claim 1, further comprising microwave means, adapted to detect stratification by vertical stacking, in the sole, by detection of successive echoes following emission of waves towards the sole.

10. The device as claimed in claim 9, further comprising a plurality of means adapted to detect successive vertical echoes distributed over the length of the device.

11. The device as claimed in claim 1, further comprising microwave adapter coupling means, inserted in between microwave transducers and a foot support plate.

12. The device as claimed in claim 11, wherein the microwave adapter coupling means comprise a pyramid engaged in a cone associated with a microwave transducer, said pyramid being made from material of the foot support plate.

13. The device as claimed in claim 1, further comprising said at least one first electrode placed on the support base concentric to cones associated with microwave transducers adapted to generate microwaves vertically in the sole, wherein each microwave sender and receiver is associated with a focusing cone.

14. The device as claimed in claim 1, further comprising an electric generator and a resistor connected in series between said first and second electrodes and means for measuring the voltage at the terminal of the resistor, the voltage sampled at the terminals of the resistor being directly representative of the height of the sole.

15. A method for analysis of signals coming from a device for detection of unauthorized objects or substances, comprising:
   a support base to receive a shoe worn by an individual to be controlled;

a pair of panels coupled to said support base;

said support base including means for measuring electrical capacitance including at least one first electrode disposed on an upper surface of the support base and at least one second electrode disposed on a surface of the panels, wherein said method comprises measuring values obtained by said first and second electrodes to determine a height of a sole of said shoe placed on said support base using said measured electrical capacitance.

16. A detector device for detection of unauthorised objects or substances, comprising a support base designed to receive at least one foot covered by its shoe, of an individual to be controlled, comprising means for measuring an electrical capacitance formed by the sole of a shoe placed on the support base, wherein said device comprises at least one microwave sender means placed to one side of the base, at least one microwave receiver means placed on the side opposite the base such that microwaves emitted by the microwave sender means pass through the sole of the shoe placed on the support base before reaching the associated microwave receiver means placed on the side opposite the base and at least one means for measuring a width of an element inserted between the microwave sender means and the microwave receiver means, comprising infrared senders/receivers adapted to measure the time of two-way propagation between an infrared sender and an associated infrared receiver.

17. A detector device for detection of unauthorised objects or substances, comprising a support base designed to receive at least one foot covered by a shoe worn by an individual to be controlled, wherein said device comprises means for measuring an electrical capacitance formed by the sole of a shoe placed on the support base, wherein said device comprises an electric generator connected in series between, on one side, handles provided on lateral panels, and on another side, electrodes placed on the support base, wherein the electrodes placed on the support base are concentric to cones associated with microwave transducers adapted to generate microwaves vertically in the sole.

18. A detector device for detection of unauthorised objects or substances, comprising:

a support base designed to receive a foot covered by a shoe worn by an individual to be controlled, wherein said device comprises means for measuring an electrical capacitance formed by the sole of the shoe when placed on the support base, wherein said device comprises electrodes placed on the support base which are concentric to cones associated with microwave transducers adapted to generate microwaves vertically in the sol of the shoe, wherein each microwave transducer is associated with a focusing cone.

* * * * *